(12) United States Patent
Laaninen et al.

(10) Patent No.: US 10,209,007 B2
(45) Date of Patent: Feb. 19, 2019

(54) METHOD AND ARRANGEMENT FOR MONITORING PERFORMANCE OF A BURNER OF A SUSPENSION SMELTING FURNACE

(71) Applicant: OUTOTEC (FINLAND) OY, Espoo (FI)

(72) Inventors: Aki Laaninen, Espoo (FI); Elli Miettinen, Espoo (FI); Peter Björklund, Espoo (FI); Lauri P. Pesonen, Ontario (CA)

(73) Assignee: OUTOTEC (FINLAND) OY, Espoo (FI)

( * ) Notice: Subject to any disclaimer, the term of this patent is extended or adjusted under 35 U.S.C. 154(b) by 208 days.

(21) Appl. No.: 15/302,086

(22) PCT Filed: Apr. 10, 2015

(86) PCT No.: PCT/FI2015/050245
§ 371 (c)(1),
(2) Date: Oct. 5, 2016

(87) PCT Pub. No.: WO2015/155415
PCT Pub. Date: Oct. 15, 2015

(65) Prior Publication Data
US 2017/0191760 A1    Jul. 6, 2017

(30) Foreign Application Priority Data

Apr. 11, 2014    (FI) ...................................... 20145347

(51) Int. Cl.
*F27D 21/02*    (2006.01)
*F23N 5/08*    (2006.01)
*F27D 21/00*    (2006.01)

(52) U.S. Cl.
CPC ............... *F27D 21/02* (2013.01); *F23N 5/08* (2013.01); *F23N 5/082* (2013.01); *F27D 21/00* (2013.01);
(Continued)

(58) Field of Classification Search
CPC .... F27D 21/02; F27D 21/00; F27D 2021/026; F23N 5/08; F23N 5/082; F23N 2029/14; F23N 2029/16; F23N 2029/20
See application file for complete search history.

(56) References Cited

U.S. PATENT DOCUMENTS

| | | | |
|---|---|---|---|
| 3,689,773 A | 9/1972 | Wheeler | |
| 3,900,310 A * | 8/1975 | Kaasila | ..................... C22B 5/08 75/455 |
| 6,238,457 B1 | 5/2001 | Holmi et al. | |

FOREIGN PATENT DOCUMENTS

| | | |
|---|---|---|
| CN | 1232538 A | 10/1999 |
| CN | 1496397 A | 5/2004 |

(Continued)

OTHER PUBLICATIONS

Office Action issued by the Chilean Patent Office in corresponding Chilean Patent Application No. 201602519 dated Oct. 4, 2016 (11 pages).

(Continued)

*Primary Examiner* — David V Bruce
(74) *Attorney, Agent, or Firm* — Buchanan, Ingersoll & Rooney PC

(57) ABSTRACT

Provided are a method and an arrangement for monitoring performance of a burner of a suspension smelting furnace. The burner is arranged at the top structure of a reaction shaft of the suspension smelting furnace. The burner has a solids feeding channel that has a solids outlet opening up into the reaction shaft, and a reaction gas channel comprising a reaction gas channel a that has a reaction gas outlet opening (Continued)

Figure 1:
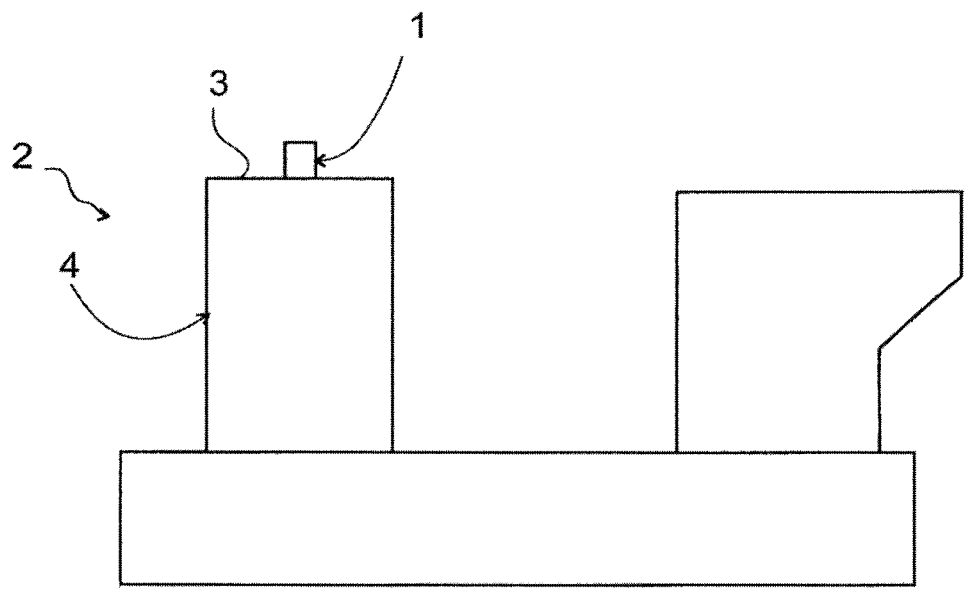

up into the reaction shaft. The arrangement comprises at least one imaging means for producing images representing the cross-section of the reaction gas channel, and a processing means for receiving images of the cross-section of the reaction gas channel from the imaging means.

28 Claims, 3 Drawing Sheets

(52) U.S. Cl.
CPC ...... *F23N 2029/14* (2013.01); *F23N 2029/16* (2013.01); *F23N 2029/20* (2013.01); *F27D 2021/026* (2013.01)

(56) References Cited

FOREIGN PATENT DOCUMENTS

| | | |
|---|---|---|
| CN | 102 816 883 A | 12/2012 |
| EP | 1 457 575 A1 | 9/2004 |
| EP | 2290310 A1 | 3/2011 |
| JP | H04-148110 A | 5/1992 |
| JP | 2755807 B2 | 5/1998 |
| JP | 2003-343810 A | 12/2003 |
| JP | 2012-224879 A | 11/2012 |
| WO | WO 98/14741 A1 | 4/1998 |
| WO | 2008/049514 A1 | 5/2008 |
| WO | 2011/128170 A1 | 10/2011 |
| WO | 2014/167532 A1 | 10/2014 |

OTHER PUBLICATIONS

Notice of Grounds for Rejection issued by the Korean Intellectual Property Office in corresponding Korean Patent Application No. 10-2016-7028520 dated Apr. 18, 2017 (15 pages including partial English translation).
International Search Report (PCT/ISA/210) dated Jul. 7, 2015, by the European Patent Office as the International Searching Authority for International Application No. PCT/FI2015/050245. (4 pages).
Written Opinion (PCT/ISA/237) dated Jul. 7, 2015, by the European Patent Office as the International Searching Authority for International Application No. PCT/FI2015/050245. (8 pages).
Notification of Transmittal of the International Preliminary Report on Patentability (Form PCT/IPEA/416) and International Preliminary Report on Patentability (Form PCT/IPEA/409) dated Feb. 29, 2016, in the corresponding International Application No. PCT/FI2015/050245. (16 pages).
Finnish Search Report dated Dec. 1, 2014, issued by the Finnish Patent Office in the corresponding Finnish Patent Application No. 20145347. (1 page).
Office Action issued by the State Intellectual Property Office of the People's Republic of China, in corresponding Chinese Patent Application No. 201580018866.8 dated Jun. 8, 2017 (19 pages including partial English translation).

\* cited by examiner

METHOD AND ARRANGEMENT FOR MONITORING PERFORMANCE OF A BURNER OF A SUSPENSION SMELTING FURNACE

FIELD OF THE INVENTION

The invention relates to a method for monitoring performance of a burner, such as a concentrate burner or a matte burner, of a suspension smelting furnace, such as a flash smelting furnace or a flash converting furnace as defined in the preamble of independent claim 1.

The invention also relates to an arrangement for monitoring performance of a burner, such as a concentrate burner or a matte burner, of a suspension smelting furnace, such as a flash smelting furnace or a flash converting furnace as defined in the preamble of independent claim 15.

The invention relates also to various uses of the method and of the arrangement.

Publication WO 98/14741 presents a suspension smelting furnace having a burner.

OBJECTIVE OF THE INVENTION

The object of the invention is to provide a method and an arrangement which enables online monitoring the performance of a burner of a suspension smelting furnace so that it is easy to fast react on issues possible having effect on the performance of the burner or issues which will have an effect on the performance of the burner.

SHORT DESCRIPTION OF THE INVENTION

The invention is based on producing images representing the cross-section of the reaction gas channel by means of at least one imaging means, receiving the image of the cross-section of the reaction gas channel from the imaging means with a processing means, and possible comparing, by means of the processing means, the image of the cross-section of the reaction gas channel with a threshold image representing the cross-section of the reaction gas channel.

The invention provides for a method and for an arrangement which enables online monitoring the performance of a burner of a suspension smelting furnace so that it is easy to fast react on issues possible having effect on the performance of the burner or issues which will have an effect on the performance of the burner.

An issue having effect on the performance of the burner is the symmetry of the reaction gas outlet of the burner with respect to the vertical center line of the burner. If the reaction gas outlet of the burner is not symmetrical with respect to the vertical center line of the burner, the amount of slag loss rises, the utilization of oxygen is lower, the magnetite ($Fe_3O_4$) ratio in the slag rises, the amount of dust rises and more build-up is formed at the outlets of the burner. Prior this method and arrangement, it has only been possible to determine symmetry of the reaction gas outlet of the burner with respect to the vertical center line of the burner during shut-downs. Because shut-downs occurs only monthly or bimonthly, poor performance can occur for a long period of time.

An issue having effect on the performance of the burner can be build-up in the region of the reaction gas outlet of the burner, which has a negative effect on the symmetry of the reaction gas outlet of the burner. The method and the arrangement provides for online surveillance of the build-up situation and for a possibility to immediately react on the build-up situation and to remove possible build-up. Build-up has been found to raise slag loss, to lower the utilization of oxygen, to raise magnetite ($Fe_3O_4$) ratio in the slag, and to raise the amount of dust.

The invention relates also to the use of the method or to the use of the arrangement for monitoring reaction between solids and reaction gas in the reaction shaft of the suspension smelting furnace i.e. to monitor the flame in the reaction shaft. By following the flame, the operators can determine if there is build-up in the vicinity of the burner or at the burner.

LIST OF FIGURES

Figure 2:
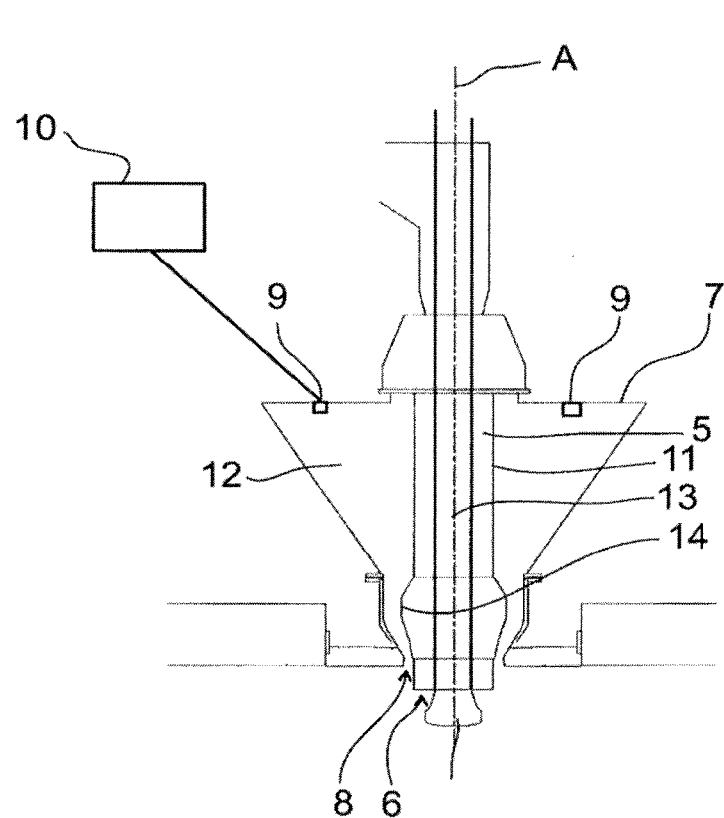
Figure 3:
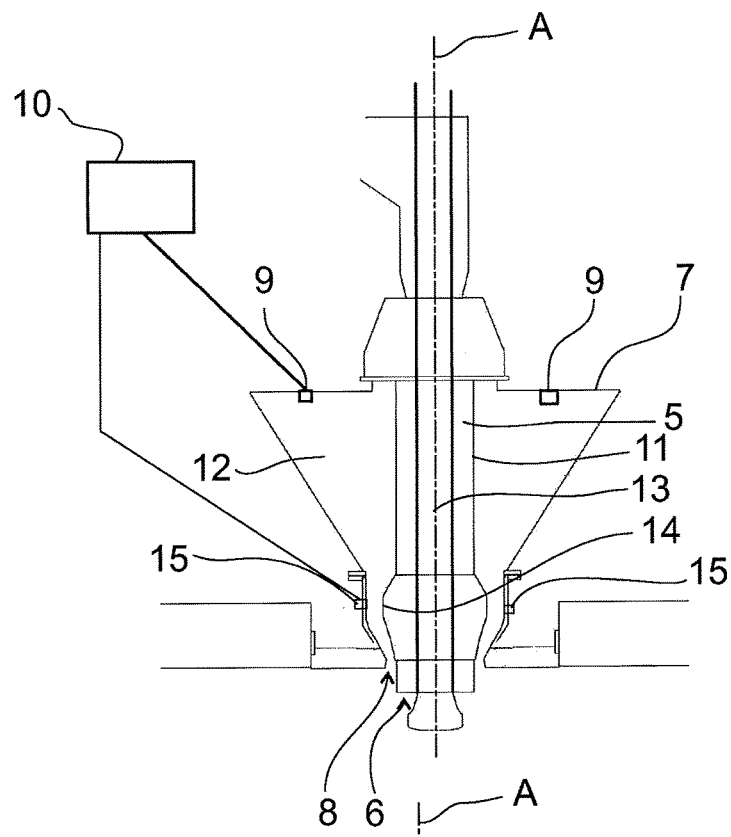
Figure 4:
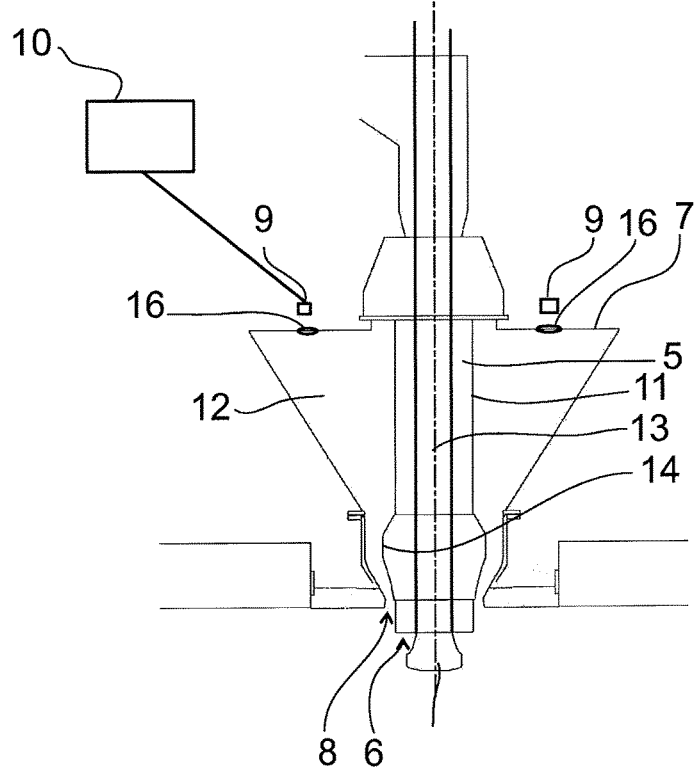
Figure 5:
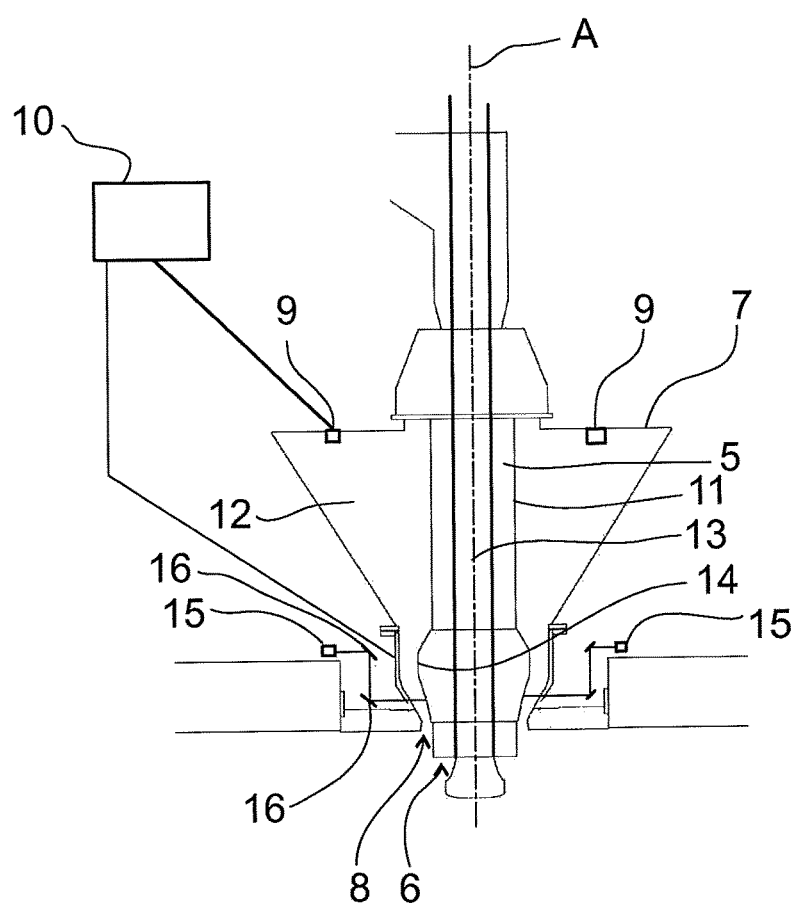

In the following the invention will described in more detail by referring to the figures, of which FIG. 1 shows a suspension smelting furnace, FIG. 2 shows in cross section a burner according to a first embodiment, FIG. 3 shows in cross section a burner according to a second embodiment, FIG. 4 shows in cross section a burner according to a third embodiment, and FIG. 5 shows in cross section a burner according to a fourth embodiment.

DETAILED DESCRIPTION OF THE INVENTION

The invention relates to a method and to an arrangement for monitoring performance of a burner 1, such as a concentrate burner or a matte burner, of a suspension smelting furnace 2, such as a flash smelting furnace or a flash converting furnace.

First the method and some embodiments and variants of the method will be described in greater detail.

In the method, the burner 1 is arranged at a top structure 3 of a reaction shaft 4 of the suspension smelting furnace 2 and the burner 1 having a solids feeding channel 5 that has a solids outlet 6 opening up into the reaction shaft 4 for feeding solids (not shown in the drawings) such as sulfidic metal concentrate and possible slag forming material into the reaction shaft 4, and a reaction gas channel 12 having a reaction gas outlet 8 opening up into the reaction shaft 4 of the suspension smelting furnace 2 for feeding reaction gas (not shown in the drawings) such as air, oxygen-enriched air, or oxygen into the reaction shaft 4.

The method comprises providing at least one imaging means 9.

The method comprises by producing an image representing the cross-section of the reaction gas channel 12 by means of at least one imaging means 9.

The method comprises receiving the image of the cross-section of the reaction gas channel 12 from the imaging means 9 with a processing means 10. It is for example possible to follow colors in the image to monitor the reaction in the reaction shaft 4 of the suspension smelting furnace.

The method may comprise comparing, by means of the processing means 10, the image of the cross-section of the reaction gas channel 12 with a threshold image representing the cross-section of the reaction gas channel 12. The build-up situation at the burned can for example be monitored online by comparing images illustrating the currents situation with said threshold image.

The method comprises preferably, but not necessarily, arranging said at least one imaging means 9 to produce images the cross-section of the reaction gas channel 12 at the reaction gas outlet 8 i.e. so that also the interior of the reaction shaft 4 is partly visible in the images. This can be achieved by correct placing and/or directing of said at least one imaging means 9. The method may comprise arranging said at least one imaging means 9 at least partly outside the burner 1.

The method may comprise, as shown in FIG. 4, arranging said at least one imaging means 9 outside the burner 1 and providing optical means 16 such as lenses, objectives, and/or mirrors for directing images between the inside of the reaction gas channel 12 of the burner 1 and said at least one imaging means 9 outside the burner 1.

The method comprises preferably, but not necessarily, arranging said at least one imaging means 9 in the reaction gas channel 12 of the burner 1. In such case, said at least imaging means 9 is preferably placed and/or directed in the reaction gas channel 12 of the burner 1 to produce images the cross-section of the reaction gas channel 12 at the reaction gas outlet 8 i.e. so also the interior of the reaction shaft 4 is partly visible in the images.

If the reaction gas channel 12 of the burner 1 is axially limited by a reaction gas channel top wall 7, said at least one imaging means 9 may be arranged in the reaction gas channel top wall 7. In such case, said at least imaging means 9 is preferably placed and/or directed in the reaction gas channel 12 of the burner 1 to produce images the cross-section of the reaction gas channel 12 at the reaction gas outlet 8 i.e. so also the interior of the reaction shaft 4 is partly visible in the images.

The method comprises preferably, but not necessarily, providing at least two imaging means 9 and arranging the imagining means symmetrically with respect to a vertical central line A of the burner 1. This is especially advantageous, if reaction gas channel 12 is in the form of an annular reaction gas channel 12, as is the case in the embodiments shown in the drawings, because this enables producing an image of the whole cross-section of the reaction gas channel 12. It is for example possible that the method comprises providing 3 imaging means 9, which are arranged symmetrically with respect to a vertical center line A of the burner 1 with a distance of 120 degrees between two adjacent imaging means 9, or that the method comprises providing 4 imaging means 9, which are arranged symmetrically with respect to a vertical center line A of the burner 1 with a distance of 90 degrees between two adjacent imaging means 9.

The method may comprise arranging at least two laser rangefinders for measuring width of the reaction gas channel 12 and measuring width of the reaction gas channel by using said at least two laser rangefinders.

If the burner 1 used in the method comprises a flow adjustment cone 14 in the reaction gas channel 12, as is the situation in the burners 1 shown in FIGS. 2 and 3, the method may comprise arranging said at least two laser rangefinders at the flow adjustment cone 14 for measuring width of the reaction gas channel 12 at the flow adjustment cone 14.

The method may comprise arranging said at least two laser rangefinders 15 at least partly in the reaction gas channel 12 of the burner 1, preferably in the reaction gas channel 12 of the burner 1.

The method may comprise, as shown in FIG. 5, arranging said at least two laser rangefinders 15 outside the burner 1, and providing optical means 16 such as lenses, objectives, and/or mirrors for directing laser beams between the inside of the reaction gas channel 12 of the burner 1 and said at least two laser rangefinders 15 outside the burner 1.

If the method comprises arranging at least two laser rangefinders in the reaction gas channel 12, the method comprises preferably, but not necessarily, providing said at least two laser rangefinders symmetrically with respect to a vertical center line A of the burner 1. It is for example possible that the method comprises providing 3 laser rangefinders, which are arranged symmetrically with respect to a vertical center line A of the burner 1 with a distance of 120 degrees between two adjacent laser rangefinders, or that the method comprises providing 4 laser rangefinders, which are arranged symmetrically with respect to a vertical center line A of the burner 1 with a distance of 90 degrees between two adjacent laser rangefinders. The method may comprise receiving data concerning width of the reaction gas channel 12 from said at least two laser rangefinders with the processing means 10.

The method may comprise saving images representing the cross-section of the reaction gas channel 12 on a memory means.

Next the arrangement and some embodiments and variants of the arrangement will be described in greater detail.

In the arrangement, the burner 1 is arranged at a top structure 3 of a reaction shaft 4 of the suspension smelting furnace 2.

The burner 1 comprises a solids feeding channel 5 that has a solids outlet 6 opening up into the reaction shaft 4 for feeding solids (not shown in the drawings) such as sulfidic metal concentrate and possible slag forming material into the reaction shaft 4, and a reaction gas channel 12 that has a reaction gas outlet 8 opening up into the reaction shaft 4 of the suspension smelting furnace 2 for feeding reaction gas into the reaction shaft 4.

In the burners 1 shown in the drawings, the solids feeding channel 5 of the burner 1 is radially limited by a solids feeding channel wall 11 and the solids feeding channel 5 has a solids outlet 6 opening up into the reaction shaft 4 for feeding solids into the reaction shaft 4

In the burners 1 shown in the drawings, the reaction gas channel 12 is in the form of an annular reaction gas channel 12 that coaxially at least partly surrounds the annular solids feeding channel 5 and that has a reaction gas outlet 8 in the form of an annular reaction gas outlet opening up into the reaction shaft 4 of the suspension smelting furnace 2 for feeding reaction gas into the reaction shaft 4.

In the burners 1 shown in the drawings, the burner 1 comprises a solids distributor 13 for directing fine solids towards reaction gas in the reaction shaft 4 of the suspension smelting furnace 2. The solids distributor 13 is at least partly arranged in the solids feeding channel 5 so that the solids feeding channel 5 is in the form of an at least partly annular solids feeding channel 5 that coaxially at least partly surrounds the solids distributor 13, that is radially limited by the solids feeding channel wall 11, and that has a solids outlet 6 in the form of an annular solids outlet opening up into the reaction shaft 4 for feeding solids into the reaction shaft 4.

In the burners 1 shown in the drawings, the annular solids feeding channel 5 and the annular reaction gas channel 12 are symmetrically disposed with respect to a vertical center line A of the burner 1.

The arrangement comprises at least one imaging means 9 for producing images representing the cross-section of the reaction gas channel 12.

The arrangement comprises a processing means 10 for receiving images of the cross-section of the reaction gas channel 12 from the imaging means 9. It is for example possible that the processing means is configured to follow colors in the image to monitor the reaction in the reaction shaft 4 of the suspension smelting furnace.

The processing means may be configured for comparing images of the cross-section of the reaction gas channel 12 with a threshold image representing the cross-section of the reaction gas channel 12. This may for example be done to monitor the build-up situation by comparing images illustrating the currents situation with said threshold image.

Said at least one imaging means 9 may be arranged at least partly outside the burner 1.

Said at least one imaging means 9 may, as shown in FIG. 4, be arranged outside the burner 1 and the arrangement may comprise optical means 16 such as lenses, objectives, and/or mirrors for directing images between the inside of the reaction gas channel 12 of the burner 1 and said at least one imaging means 9 outside the burner 1.

The arrangement comprises preferably, but not necessarily, at least one imaging means 9 for producing images the cross-section of the reaction gas channel 12 at the reaction gas outlet 8 i.e. so that also the interior of the reaction shaft 4 is partly visible in the images. This can be achieved by correct placing and/or directing of said at least one imaging means 9.

In the arrangement, said at least one imaging means 9 may be arranged in the reaction gas channel 12 of the burner 1. If the reaction gas channel 12 is axially limited by a reaction gas channel top wall 7, said at least one imaging means 9 is preferably, but not necessarily, arranged in the reaction gas channel top wall 7.

The arrangement comprises preferably, but not necessarily, at least two imaging means 9, which are arranged symmetrically with respect to a vertical center line A of the burner 1. This is especially advantageous, if the reaction gas channel 12 is in the form of an annular reaction gas channel 12, as is the case in the embodiments shown in the drawings, because this enables producing an image of the whole cross-section of the reaction gas channel 12. It is for example possible that the arrangement comprises 3 imaging means 9, which are arranged symmetrically with respect to a vertical center line A of the burner 1 with a distance of 120 degrees between two adjacent imaging means 9, or that the arrangement comprises 4 imaging means 9, which are arranged symmetrically with respect to a vertical center line A of the burner 1 with a distance of 90 degrees between two adjacent imaging means 9.

The arrangement comprises preferably, but not necessarily, in addition to at least one imaging means 9, at least two laser rangefinders in the reaction gas channel 12 for measuring the width of the reaction gas channel. If the burner 1 comprises a flow adjustment cone 14 in the reaction gas channel 12, as is the situation in the burners 1 shown in FIGS. 2 and 3, said at least two laser rangefinders are preferably, but not necessarily, arranged in the reaction gas channel 12 at the adjustment cone 14 for measuring width of the reaction gas channel 12 at the adjustment cone 14. Said at least two laser rangefinders 15 may be arranged at least partly in the reaction gas channel 12 of the burner 1, preferably in the reaction gas channel 12 of the burner 1. Alternatively said at least two laser rangefinders 15 may, as shown in FIG. 5, be arranged outside the burner 1 and optical means 25, such as lenses, objectives, and/or mirrors may be provided for directing laser beams between the inside of the reaction gas channel 12 of the burner 1 and said at least two laser rangefinders 15 outside the burner 1.

If the arrangement comprises least two laser rangefinders in the reaction gas channel 12, said at least two laser rangefinders are preferably, but not necessarily, provided symmetrically with respect to a vertical center line A of the burner 1. It is for example possible that the arrangement comprises 3 laser rangefinders, which are arranged symmetrically with respect to a vertical center line A of the burner 1 with a distance of 120 degrees between two adjacent laser rangefinders, or that the arrangement comprises 4 laser rangefinders, which are arranged symmetrically with respect to a vertical center line A of the burner 1 with a distance of 90 degrees between two adjacent laser rangefinders. The processing means 10 may be configured for receiving data concerning width of the reaction gas channel 12 from said at least two laser rangefinders.

The arrangement comprises preferably, but not necessarily, a memory means for saving images representing the cross-section of the reaction gas channel 12.

The invention relates also to the use of the method or to the use of the arrangement for determining symmetry of the reaction gas outlet 8 of the burner 1.

The invention relates also to the use of the method or to the use of the arrangement for detecting build-up.

The invention relates also to the use of the method or to the use of the arrangement for monitoring reaction between solids and reaction gas and possible fuel such as oil in the reaction shaft 4 of the suspension smelting furnace 2.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A method for monitoring performance of a burner of a suspension smelting furnace,
   wherein the burner is arranged at the top structure of a reaction shaft of the suspension smelting furnace and wherein the burner having
   an solids feeding channel that has a solids outlet opening up into the reaction shaft for feeding solids into the reaction shaft, and
   a reaction gas channel having a reaction gas outlet opening up into the reaction shaft of the suspension smelting furnace for feeding reaction gas into the reaction shaft,
   wherein the solids feeding channel of the burner being radially limited by the solids feeding channel wall and that has a solids outlet opening up into the reaction shaft for feeding solids into the reaction shaft, and
   wherein the reaction gas channel of the burner being an annular reaction gas channel that coaxially at least partly surrounds the annular solids feeding channel and that has a reaction gas outlet in the form of an annular reaction gas outlet opening up into the reaction shaft of the suspension smelting furnace for feeding reaction gas into the reaction shaft,
   wherein
   by providing at least two imaging means,
   by arranging the imagining means symmetrically with respect to a vertical center line A of the burner,
   by producing an image representing the cross-section of the reaction gas channel by means of at least one imaging means, and
   by receiving the image of the cross-section of the reaction gas channel from the imaging means with a processing means.

2. The method according to claim 1, wherein by comparing the image of the cross-section of the reaction gas channel with a threshold image representing the cross-section of the reaction gas channel with the processing means.

3. The method according to claim 1, wherein by arranging at least one of the at least two imaging means at least partly outside the burner.

4. The method according to claim 1, wherein
by arranging at least one of the at least two imaging means outside the burner, and
by providing optical means for directing images between the inside of the reaction gas channel of the burner and at least one of the at least two imaging means outside the burner.

5. The method according to claim 1, wherein by arranging at least one of the at least two imaging means in the reaction gas channel of the burner.

6. The method according to claim 5, wherein
by the reaction gas channel being axially limited by a reaction gas channel top wall, and
by arranging at least one of the at least two imaging means in the reaction gas channel top wall.

7. The method according to claim 1, wherein
by providing at least two laser rangefinders for measuring width of the reaction gas channel, and
by measuring the width of the reaction gas channel by means of said at least two laser rangefinders.

8. The method according to claim 7, wherein
by the burner comprising a flow adjustment cone in the reaction gas channel, and
by arranging said at least two laser rangefinders for measuring width of the reaction gas channel at the adjustment cone.

9. The method according to claim 7, wherein by arranging said at least two laser rangefinders at least partly in the reaction gas channel of the burner, preferably in the reaction gas channel of the burner.

10. The method according to claim 7, wherein
by arranging said at least two laser rangefinders outside the burner, and
by providing optical means for directing laser beams between the inside of the reaction gas channel of the burner and said at least two laser rangefinders outside the burner.

11. The method according to claim 7, wherein by providing said at least two laser rangefinders symmetrically with respect to a vertical center line A of the burner.

12. The method according to claim 7, wherein by receiving data concerning width of the reaction gas channel from said at least two laser rangefinders with the processing means.

13. The method according to claim 1, wherein by saving images representing the cross-section of the reaction gas channel on a memory means.

14. An arrangement for monitoring performance of a burner of a suspension smelting furnace,
wherein the burner is arranged at the top structure of a reaction shaft of the suspension smelting furnace and wherein the burner having
a solids feeding channel that has a solids outlet opening up into the reaction shaft for feeding solids into the reaction shaft,
a reaction gas channel comprising a reaction gas channel that has a reaction gas outlet opening up into the reaction shaft of the suspension smelting furnace for feeding reaction gas into the reaction shaft,
wherein the solids feeding channel of the burner being radially limited by the solids feeding channel wall and that has a solids outlet opening up into the reaction shaft for feeding solids into the reaction shaft, and wherein the reaction gas channel of the burner being an annular reaction gas channel that coaxially at least partly surrounds the annular solids feeding channel and that has a reaction gas outlet in the form of an annular reaction gas outlet opening up into the reaction shaft (4) of the suspension smelting furnace for feeding reaction gas into the reaction shaft,
wherein
by at least two imaging means for producing images representing the cross-section of the reaction gas channel,
by the imagining means being arranged symmetrically with respect to a vertical center line A of the burner, and
by a processing means for receiving images of the cross-section of the reaction gas channel from the imaging means.

15. The arrangement according to claim 14, wherein by the processing means being configured for comparing images of the cross-section of the reaction gas channel with a threshold image representing the cross-section of the reaction gas channel.

16. The arrangement according to claim 14, wherein by at least one of the at least two imaging means being arranged at least partly outside the burner.

17. The arrangement according to claim 14, wherein
by at least one of the at least two imaging means being arranged outside the burner, and
by optical means for directing images between the inside of the reaction gas channel of the burner and at least one of the at least two imaging means outside the burner.

18. The arrangement according to claim 14, wherein by at least one of the at least two imaging means being arranged in the reaction gas channel of the burner.

19. The arrangement according to claim 18, wherein
by the reaction gas channel being axially limited by a reaction gas channel top wall, and
by at least one of the at least two imaging means being arranged in the reaction gas channel top wall.

20. The arrangement according to claim 18, wherein by at least two laser rangefinders in the reaction gas channel for measuring width of the reaction gas channel.

21. The arrangement according to claim 20, wherein
by the burner comprising a flow adjustment cone in the reaction gas channel, and
by said at least two laser rangefinders being arranged at the adjustment cone for measuring width of the reaction gas channel at the adjustment cone.

22. The arrangement according to claim 20, wherein by said at least two laser rangefinders being arranged at least partly in the reaction gas channel of the burner, preferably in the reaction gas channel of the burner.

23. The arrangement according to claim 20, wherein
by said at least two laser rangefinders being arranged outside the burner, and
by optical means for directing laser beams between the inside of the reaction gas channel of the burner and said at least two laser rangefinders outside the burner.

24. The arrangement according to claim 20, wherein by providing said at least two laser rangefinders symmetrically with respect to a vertical center line A of the burner.

25. The arrangement according to claim 20, wherein by the processing means being configured for receiving data concerning width of the reaction gas channel from said at least two laser rangefinders.

26. The arrangement according to claim 20, wherein by a memory means for saving images representing the cross-section of the reaction gas channel.

27. The arrangement according to claim 14, wherein
by the burner comprises a solids distributor for directing fine solids towards reaction gas in the reaction shaft of the reaction shaft of the suspension smelting furnace, and
by the solids distributor being at least partly arranged in the solids feeding channel so that the solids feeding channel is in the form of an at least partly annular solids feeding channel that coaxially at least partly surrounds the solids distributor, that is radially limited by the solids feeding channel wall, and that has a solids outlet in the form of an annular solids outlet opening up into the reaction shaft for feeding solids into the reaction shaft.

28. The arrangement according to claim 14, wherein by the solids feeding channel and the annular reaction gas channel being symmetrically disposed with respect to a vertical center line A of the burner.

\* \* \* \* \*